United States Patent Office 3,415,774
Patented Dec. 10, 1968

3,415,774
PORTLAND CEMENT COMPOSITIONS
Richard T. Hood, Butler, and Myron I. Dietrick, East Brady, Pa., assignors to Industrial Research and Manufacturing, Inc., Indianapolis, Ind., a corporation of Indiana
No Drawing. Filed Sept. 8, 1964, Ser. No. 395,054
5 Claims. (Cl. 260—38)

ABSTRACT OF THE DISCLOSURE

An ultra high-strength concrete composition is provided. The concrete contains a major amount of concrete formed from water, portland cement and mineral aggregate; a minor amount of an in situ-formed cross-linked condensation product of a polyhydric phenol, such as resorcinol, and heat-polymerized paraformaldehyde; and a minor percentage of a lower alcohol. The composition provides a cementitious mix having a workable time prior to setting up of sufficient length to permit the use of the mix in large scale operations at ordinary temperatures.

---

This invention relates to improved cement-containing compositions. More particularly, this invention relates to ultra high-strength concrete compositions containing a minor amount of polyhydric phenol-paraformaldehyde condensation product formed in situ during the curing of the concrete.

While ordinary concrete is an eminently satisfactory material for the construction of roads, sidewalks, buildings, floors, and the like, there are certain special situations wherein an improvement in the properties of concrete is desirable, particularly with regard to tensile strength and compressive strength. Furthermore, ordinary concrete crumbles under excessively high temperatures; it is slightly absorbent for water; it is subject to dusting; and is not too resistant to chemical attack. Finally, concrete can be poured at freezing temperatures only with the addition of salt solutions, and the resulting concrete is thereby weakened.

In the copending application of James D. Collins and Edward L. Shriver, Ser. No. 395,058, filed even date herewith now U.S. Patent 3,216,966, there is described an ultra high-strength concrete which is markedly superior to ordinary concrete. The novel concrete is made by admixing 1–10 parts by weight hydraulic cement, preferably portland cement, 3–7 parts by weight mineral aggregate per part hydraulic cement, one part by weight of a polyhydric phenol selected from the group consisting of resorcinol and phloroglucinol, 1.25–3 moles, per mole of polyhydric phenol, of an aldehyde selected from the group consisting of formaldehyde and glyoxal, and sufficient water to hydrate the cement.

The new class of concrete compositions provided by Collins and Shriver represents a significant contribution to the art of specialty concrete manufacture. The extreme rapidity with which these concrete compositions set up and attain high tensile and compressive strength makes them particularly useful in situations where quick repair work is mandatory. For example, in the patching of bridges and roadways where it is undesirable to restrict the flow of traffic for any length of time, the novel compositions will attain adequate strength to permit the passage of traffic thereover in a matter of hours. Unfortunately, the preferred compositions falling within the generic class defined by Collins and Shriver set up within 15 minutes at ordinary temperatures, which limits the use of these compositions to small scale patching and guniting operations or application at freezing temperatures. We have discovered an improvement in the preferred compositions of Collins and Shriver that provides a composition having a workable mixing time, prior to setting up, of up to about two hours.

In accordance with the invention there is provided an ultra high-strength concrete composition containing a major amount of concrete formed from water, portland cement and mineral aggregate; a minor amount of an in situ-formed cross-linked condensation product of a polyhydric phenol selected from the group consisting of resorcinol and phloroglucinol, and heat-polymerized paraformaldehyde; i.e., polyoxymethylene; and from 1.5–7 percent by weight of an alkanol having up to six carbon atoms, the percent alkanol being based upon the weight of the total mix, including water.

The novel concrete compositions of the invention are made by mixing the resin-forming ingredients with the portland cement and mineral aggregate in the dry state, adding sufficient water for the hydration of the cement in forming concrete, and adding the alcohol in an amount within the above-indicated range. The total amount of alcohol and water added to the mix are adjusted to provide a slurry of the desired consistency. The portland cement, water, alcohol, mineral aggregate, and resin-forming ingredients are thoroughly mixed and then poured into forms. The mixing and pouring can be completed in a time ranging between about one-half to two hours, depending upon the degree of polymerization of the paraformaldehyde and the amount of alcohol used in the preparation of the cementitious mixes.

Portland cement, which is used in making the compositions of the invention, is defined by Kirk and Othmer in the Encyclopedia of Chemical Technology, Interscience Publishers, Inc. (1949), volume 3, p. 412 et seq., as a class of hydraulic cements, the essential constituents of which are two calcium silicates, $3CaO.SiO_2$ and tions of tetracalcium aluminoferrite and tricalcium aluminate. The most probable chemical composition of the common type of portland cement is 42 percent tricalcium silicate, 34 percent dicalcium silicate, 9.5 percent tricalcium aluminoferrite, and 6.7 percent tricalcium aluminate.

The term "mineral aggregate" as used in the above description of the invention means any of the many materials, singly or in combination, which have been used in the past to prepare concrete and their equivalents. Suitable mineral aggregates include sand, gravel, crushed rock, broken concrete, slag, bricks, clinker, etc. Mineral aggregates of particular value for the purposes of this invention include mixtures of sand with pebbles or flints from gravel beds, crushed granite, gneiss, trap, hard sandstone, and other similar materials.

Paraformaldehyde in one of its higher polymerized forms, commonly referred to as alpha-polyoxymethylene or beta-polyoxymethylene, must be used to furnish the formaldehyde for the in situ-formed resorcinol-formaldehyde resin. The higher polymers of paraformaldehyde are easily prepared by heating paraformaldehyde to a temperature of approximately 100° C., preferably in the presence of an acid catalyst, such as oxalic acid or a Lewis acid. The degree of reactivity of a particular polyoxymethylene varies with the extent to which the paraformaldehyde is heat polymerized; the higher the degree of polymerization, the lesser the reactivity. The use of less reactive polyoxymethylenes provides a cementitious mix having a greater working time. The polyoxymethylene should be added in such a manner that it cannot be thoroughly contacted with the polyhydric phenol and uniformly dispersed throughout the cementitious mix to provide a homogeneous distribution of the in situ-formed resin in the final cured product.

Polyhydric phenols useful in the invention are limited to resorcinol and phloroglucinol. Other phenols, such as phenol, 3,5-xylenol, and catechol, give crumbly products with low compressive strength. Resorcinol, because of its lower cost and greater availability, is the preferred polyhydric product. The polyhydric phenol can be pre-reacted with formaldehyde to the extent that the pre-reacted product remains completely water-soluble at the time of its introduction to the concrete mix. Thus, various methylolated resorcinols can be used, including water-soluble resorcinol-formaldehyde resins containing up to 0.8 mole of formaldehyde per mole of phenolic body. Resorcinol can also be used in its dimeric, or condensed form; i.e., trihydroxydiphenyl.

The ratio of polymerized paraformaldehyde (polyoxymethylene) to polyhydric phenol employed in our novel compositions can vary from about 1.25 mols of paraformaldehyde to about 3 moles of paraformaldehyde per mole of polyhydric phenol. As is well understood in the resin art, the greater the amount of formaldehyde present, the greater the amount of cross-linking to be found in the final product. For some concrete compositions, however, a high degree of cross-linking of the in situ-formed resin is not necessarily desirable. In the preferred compositions we employ about 1.5 to 2 moles of paraformaldehyde for each mole of resorcinol used, inasmuch as the concrete compositions containing resorcinol-formaldehyde resins having these paraformaldehyde/resorcinol ratios have markedly improved properties when compared with those of ordinary concrete. As noted hereabove, the portion of the formaldehyde in the in situ-formed resin can be provided by using a pre-reacted resorcinol-formaldehyde product that is completely water-soluble at the time of its introduction to the concrete mix.

The amount of resin formed in situ in our novel concrete composition is generally based upon the amount of portland cement present and can vary from about one part of resin to from about one to about ten parts of portland cement, all parts being by weight. Ratios of portland cement to resin in the range of 1:1 to 5:1 are preferable, since the concrete compositions containing these ratios have greatly improved tensile strength and compressive strength. If greater than about five parts cement is used, the mix tends to be dry and more water than usual must be added. If greater than ten parts cement is used, the strength properties of the novel concrete cannot be obtained. If less than one part cement is used, the mix becomes too thin and excessive bleeding occurs.

The ratios of portland cement to mineral aggregate or filler, such as sand, gravel, asbestos, etc., present in the compositions of this invention are those customarily employed in the cement art and vary from one part of cement to three to seven parts of mineral aggregate, depending upon the use to which the concrete is to be put. If greater than seven parts aggregate is used, the strength of the resulting concrete is appreciably diminished.

In forming our novel compositions certain constituents of portland cement apparently act as a catalyst for the polymerization of the polyhydric phenol and aldehyde, because the slurry becomes very hot upon mixing and aldehyde fumes are sometimes given off. It is this heat of polymerization, a kind of internal heat source, which permits the concrete compositions of this invention to be mixed and poured at or near freezing temperature. The rate of polymerization, and thus the rate of heating, can be increased by the addition of free alkali and can be decreased by the addition of inert diluents, such as the mineral aggregate, by the amount of water and alcohol added to the cement mixture, and by the rate of addition of the water and alcohol. In general, the more water that is added, the slower the polymerization reaction.

The extended set time of the cementitious mixes of the invention are obtained by the combined effect of adding formaldehyde in the form of polyoxymethylene and by adding 1.5–7 percent by weight, preferably 3–5 percent by weight, of an alkanol having up to six carbon atoms to the reaction mixture. In order to be effective in combination with the use of polyoxymethylene, the alkanol must be added in an amount of at least 1.5 percent by weight. Since the consistency of the mix depends upon the total amount of water plus alcohol added to the mix, there is a practical maximum amount of alcohol that can be used. If the amount of water added is limited to that required for hydration, the amount of alcohol used cannot exceed about 7 percent by weight without making the mixture too thin and, therefore, subject to excessive bleeding. Preferred alcohols for use in the reaction mixture include methyl alcohol, ethyl alcohol, isopropyl alcohol, butyl alcohol, and t-butyl alcohol.

The water and alcohol initially added to the dry mixture of portland cement and mineral filler gives a workable slurry which can be poured into forms. As the concrete sets in the form, however, the added water hydrates the portland cement to give the mixture of mineral aggregate and hydrated cement which is known generically as concrete. The amount and uniformity of hydration determines to a large degree the properties of the final concrete, particularly as regards tensile and compressive strengths. The polymerization reaction between the polyhydric phenol and aldehyde, which, if initiated in the cement slurry at the time of mixing, also furnishes water; one molecule of water being given off for each reaction between one aldehyde and two polyhydric phenol molecules. Thus, the polymerization reaction, as it proceeds to completion within the concrete, furnishes added water for the hydration of the portland cement. This internally provided water is provided more uniformly and efficiently than is possible with the use of externally added water alone. Thus, this molecular hydration, made possible by the polymerization reaction between the polyhydric phenol and aldehyde which takes place within the setting concrete, contributes to the increased strength of the concrete compositions of this invention.

The amount of water added during the mixing of the concrete is not particularly critical, provided that there is water present to hydrate the mix. The amount added is dependent to some extent upon the amount of alcohol used, since the mix must contain sufficient liquid to make it workable and less than that amount which causes bleeding. Generally, it is convenient to add 25–50 parts by weight water plus alcohol for each 100 parts by weight of portland cement plus polyhydric phenol.

Our invention is further illustrated by the following examples:

EXAMPLE I

A series of experiments were made to determine the effect of using various polyoxymethylenes as resin-forming ingredients in the cement mix. Five mixes, identifide in the following table as A, B, C, D, and E, were prepared containing 6.87 parts by weight resorcinol, 3.77 parts by weight paraformaldehyde or polyoxymethylene, 16.2 parts by weight portland cement, 63.65 parts by weight sand, 4.62 percent by weight methyl alcohol, and 4.62 parts by weight water. The resulting cementitious mixtures had a resorcinol to formaldehyde mole ratio of 1:2, a resin to cement weight ratio of 40:60 and a water plus alcohol to cement plus resorcinol weight ratio of 40:100. The reactivity of untreated paraformaldehyde is rated as one and the reactivity of the four polyoxymethylenes tested is comparative, based on the reactivity of the untreated standard. The results are shown in Table I.

TABLE I

| Mix | Temp., °C. | Workable time, min. | Reactivity of paraformaldehyde or polyoxymethylene | Compressive strength, p.s.i., 2″ cubes | | |
|---|---|---|---|---|---|---|
| | | | | 3 hrs. | 24 hrs. | 7 days |
| A | 66 | 7 | [1] 1.0 | 3,000 | 3,600 | 3,712 |
| B | 47 | 30 | 0.72 | 2,750 | --------- | 3,625 |
| C | 43 | 35 | 0.58 | 1,840 | 2,375 | 4,775 |
| D | 35 | 59 | 0.46 | 1,660 | 3,240 | 3,940 |
| E | 33 | 94 | 0 38 | 1,000 | 2,600 | 2,510 |

[1] Untreated.

It can be seen from Table I that the puse of polyoxymethylene in lieu of the untreated paraformaldehyde extends the workable time of the cementitious mix to 30 minutes or more. For operations on a larger scale at ordinary temperatures, a set time of 25–30 minutes is a practical minimum. Thus, even in combination with an alcohol, untreated paraformaldehyde is ineffective in obtaining a cementitious mix having a practical workable time.

EXAMPLE II

A comparative experiment was made using the general formulation of Example I, omitting the methyl alcohol and doubling the quantity of water. Using polyoxymethylene having a reactivity of 0.22 (considerably less than those used in the above experiments), the workable time was extended only to nine minutes, thus demonstrating that in the absense of alcohol, the effect of polyoxymethylene on portland cement is not significant from the practical standpoint.

EXAMPLE III

A comparative experiment was made omitting the resin-forming ingredients and the methanol from the reaction mixture. 23.7 parts by weight portland cement, 65.2 parts by weight sand, and 11.1 parts by weight water were mixed in the usual manner. Two inch cubes of concrete made from the cementitious mix developed the following compressive strengths: 3 hours, 0 p.s.i.; 24 hours, 80 p.s.i.; and 7 days, 800 p.s.i. This experiment shows the remarkable ultra high-strength that is quickly developed by the formulations of the invention in comparison with the strength of ordinary portland cement

EXAMPLE IV

Substitution of isopropyl alcohol or n-butyl alcohol in the formulations of Example I using any of the polyoxymethylenes gives substantially similar results.

EXAMPLE V

An effective mix, comparable to those of Example I, is obtained by reducing the amount of methanol using to 2.35 percent by weight and increasing the amount of water to 6.90 parts by weight.

We claim:
1. A cementitious mixture suitable for the preparaiton of ultra high-strength concrete upon the addition of water comrpising 1–10 parts by weight portland cement, 3–7 parts by weight mineral aggregate per part portland cement, 1 part by weight of a polyhydric phenol selected from the group consisting of resorcinol and phloroglucinol, 1.25–3 moles, per mole of polyhydric phenol, of alpha-polyoxymethylene or beta-polyoxymethylene, and 1.5–7 percent by weight of an alkanol having up to six carbon atoms, the percent alkanol being based upon the weight of the total mix, including water.

2. An ultra high-strength concrete prepared from 1–10 parts by weight portland cement, 3–7 parts by weight mineral aggregate per part portland cement, 1 part by weight of a polyhydric phenol selected from the group consisting of resorcinol and phloroglucinol, 1.25–3 moles, per mole of polyhydric phenol, of alpha-polyoxymethylene or beta-polyoxymethylene, 1.5–7 percent by weight, based on the total weight, of an alkanol having up to six carbon atoms, and sufficient water to hydrate the cement.

3. An ultra high-strength concrete prepared from 1–10 parts by weight portland cement, 3–7 parts by weight mineral aggregate per part portland cement, 1 part by weight resorcinol, 1.25–3 moles, per mole of resorcinol, of alpha-polyoxymethylene or beta-polyoxymethylene, 3–5 percent by weight, based on the total weight, of an alkanol having up to six carbon atoms, and sufficient water to hydrate the cement.

4. An ultra high-strength concrete prepared from 1–10 parts by weight portland cement, 3–7 parts by weight mineral aggregate per part portland cement, 1 part by weight resorcinol, 1.25–3 moles of alpha-polyoxymethylene or beta-polyoxymethylene, 1.5–7 percent by weight methyl alcohol, and sufficient water to hydrate the cement.

5. An ultra high-strength concrete prepared by admixing 1–5 parts by weight portland cement, 3–7 parts by weight sand per part portland cement, 1 part by weight resorcinol, 1.5–2 moles, pre mole resorcinol, of alpha-polyoxymethylene or beta-polyoxymethylene, and from 25–50 parts by weight water plus methyl alcohol for each 100 parts by weight portland cement plus resorcinol, the amount of methyl alcohol representing 3–5 percent by weight of the total mix.

References Cited

UNITED STATES PATENTS

| | | | |
|---|---|---|---|
| 2,238,540 | 4/1941 | Sourwine | 106—90 |
| 3,216,966 | 11/1965 | Collins et al. | 260—38 |
| 3,239,479 | 3/1966 | Roenicke et al. | 260—33.4 |

ALLAN LIEBERMAN, *Primary Examiner.*

L. T. JACOBS, *Assistant Examiner.*